United States Patent
Huo et al.

(10) Patent No.: US 9,269,139 B2
(45) Date of Patent: Feb. 23, 2016

(54) RIB SUPPRESSION IN RADIOGRAPHIC IMAGES

(71) Applicant: Carestream Health, Inc., Rochester, NY (US)

(72) Inventors: Zhimin Huo, Pittsford, NY (US); Jing Zhang, Shanghai (CN)

(73) Assignee: Carestream Health, Inc., Rochester, NY (US)

( * ) Notice: Subject to any disclaimer, the term of this patent is extended or adjusted under 35 U.S.C. 154(b) by 95 days.

(21) Appl. No.: 14/084,651

(22) Filed: Nov. 20, 2013

(65) Prior Publication Data

US 2014/0079309 A1 Mar. 20, 2014

Related U.S. Application Data

(63) Continuation-in-part of application No. 13/527,629, filed on Jun. 20, 2012, now Pat. No. 8,913,817.

(60) Provisional application No. 61/728,829, filed on Nov. 21, 2012, provisional application No. 61/552,658, filed on Oct. 28, 2011.

(51) Int. Cl.
*G06T 7/00* (2006.01)

(52) U.S. Cl.
CPC ............. *G06T 7/0012* (2013.01); *G06T 7/0079* (2013.01); *G06T 7/0083* (2013.01); *G06T 2207/10116* (2013.01); *G06T 2207/20128* (2013.01); *G06T 2207/30008* (2013.01); *G06T 2207/30061* (2013.01); *G06T 2207/30172* (2013.01)

(58) Field of Classification Search
CPC ........... G06T 2207/30061; G06T 2207/10116; G06T 2207/20112; G06T 2207/20141; G06T 7/0079
See application file for complete search history.

(56) References Cited

U.S. PATENT DOCUMENTS 7,085,407 B2   8/2006   Ozaki
8,094,904 B2   1/2012   Slabaugh et al.
(Continued)

OTHER PUBLICATIONS

Yonghong Shi; Feihu Qi; Zhong Xue; Liya Chen; Ito, K.; Matsuo, H.; Dinggang Shen, "Segmenting Lung Fields in Serial Chest Radiographs Using Both Population-Based and Patient-Specific Shape Statistics," Medical Imaging, IEEE Transactions on , vol. 27, No. 4, pp. 481,494, Apr. 2008.*

(Continued)

*Primary Examiner* — Utpal Shah

(57) ABSTRACT

A method for rib suppression in a chest x-ray image of a patient. The method detects and labels one or more ribs in a region of interest in the x-ray image that includes a lung region. The method obtains a rib model for one or more ribs of the image and modifies detection results for the one or more ribs by applying the rib model in the region of interest. A conditioned x-ray image is formed by suppressing rib content according to the modified detection results. The conditioned x-ray image is stored, displayed, or transmitted.

20 Claims, 17 Drawing Sheets

(56) References Cited

U.S. PATENT DOCUMENTS

| | | |
|---|---|---|
| 8,204,292 B2 | 6/2012 | Knapp et al. |
| 2007/0019852 A1 | 1/2007 | Schildkraut et al. |
| 2007/0086639 A1* | 4/2007 | Sakaida .................. 382/132 |
| 2007/0086640 A1* | 4/2007 | Luo et al. .................. 382/132 |
| 2009/0060366 A1 | 3/2009 | Worrell et al. |
| 2009/0060372 A1 | 3/2009 | Maton et al. |
| 2009/0190818 A1* | 7/2009 | Huo .................. 382/132 |
| 2009/0214099 A1 | 8/2009 | Merlet |

OTHER PUBLICATIONS

Suzuki et al., Image-Processing Technique for Suppressing Ribs in Chest Radiographs by Means of Massive Training Artificial Neural Network (MTANN), *IEEE Transactions on Medical Imaging*, vol. 25, No. 4, pp. 406-416, (Apr. 2006).

Vogelsang et al., Detection and Compensation of Rib Structures in Chest Radiographs for Diagnose Assistance, *Proceedings of SPIE*, 3338, pp. 774-785 (1998).

Vogelsang et al., Model based analysis of chest radiographs, *Proceedings of SPIE 3979*, pp. 1040-1052, (2000).

M. Loog, B. van Ginneken et al., "Filter learning: Application to suppression of bony structures from chest radiographs", Medical Image Analysis, 10 (2006), pp. 826-840.

\* cited by examiner

RIB SUPPRESSION IN RADIOGRAPHIC IMAGES

CROSS REFERENCE TO RELATED APPLICATIONS

This application claims the benefit of U.S. Provisional application Ser. No. 61/728,829 filed Nov. 21, 2012, entitled "RIB SUPPRESSION IN RADIOGRAPHIC IMAGES", in the names of Huo et al, which is incorporated herein by reference in its entirety.

This application is a Continuation-in-Part of U.S. Ser. No. 13/527,629 filed Jun. 20, 2012 in the names of Huo et al, entitled, "RIB SUPPRESSION IN RADIOGRAPHIC IMAGES", which claimed priority to U.S. Provisional Patent Application Ser. No. 61/552,658 filed Oct. 28, 2011 in the names of Huo et al., entitled "RIB SUPPRESSION IN RADIOGRAPHIC IMAGES", both of which are incorporated herein by reference in their entirety.

FIELD OF THE INVENTION

The present invention relates generally to the field of radiographic imaging and more particularly to methods for detecting and suppressing rib features from a radiographic image, such as the chest x-ray.

BACKGROUND

The chest x-ray is useful for detecting patient conditions and for imaging a range of skeletal and organ structures. Radiographic images of the chest are useful for detection of lung nodules and other features that indicate lung cancer and other pathologic structures and life-threatening conditions. In clinical applications such as in the Intensive Care Unit (ICU), chest x-rays can have particular value for indicating pneumothorax as well as for tube/line positioning, and other clinical conditions. To view the lung fields more clearly and allow more accurate analysis of a patient's condition, it is useful to suppress the rib cage and related features in the chest x-ray, without losing detail of the lung tissue or other features within the chest cavity.

Methods have been proposed for detecting and suppressing rib structures and allowing the radiologist to view the lung fields without perceptible obstruction by the ribs. Some methods have used template matching, rib edge detection, or curve fitting edge detection. The applicants have recognized that it can be challenging to remove rib features from the chest x-ray image without degrading the underlying image content that can include lung tissue.

U.S. Pat. No. 8,204,292 entitled "Feature-based neural network regression for feature suppression" (Knapp) describes the use of a trained system for predicting rib components and subsequently subtracting the predicted rib components.

US Patent Application Publication No. 2009/0060366 entitled "Object segmentation in images" (Worrell) describes alternative techniques using detected rib edges to identify rib structures.

The article entitled "Image-Processing Technique for Suppressing Ribs in Chest Radiographs by Means of Massive Training Artificial Neural Network (MTANN)" by Suzuki et al. in *IEEE Transactions on Medical Imaging, Vol. 25 No. 4*, April 2006 describes methods for detection of lung nodules and other features using learned results from a database to optimize rib suppression for individual patient images.

The article entitled "Detection and Compensation of Rib Structures in Chest Radiographs for Diagnose Assistance" in *Proceedings of SPIE*, 3338:774-785 (1998) by Vogelsang et al. describes methods for compensating for rib structures in a radiographic image. Among techniques described in the Vogelsang et al. article are template matching and generation and selection from candidate parabolas for tracing rib edges.

The article entitled "Model based analysis of chest radiographs", in Proceedings of SPIE 3979, 1040 (2000), also by Vogelsang et al. describes Bezier curve matching to find rib edges in a chest radiograph for alignment of a model and subsequent rib shadow compensation.

While some of these methods may have achieved a level of success using rib edge detection to identify rib structures that can then be suppressed in the x-ray image, improvements are desired.

Thus, there is a need for a method of rib suppression that accurately detects ribs in chest x-ray images and suppresses the rib area in a chest x-ray image, while preserving the image content of underlying lung tissue.

SUMMARY

At least one embodiment of the present invention is directed to rib suppression in chest x-ray images, while preserving other image content.

Any objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a method for rib suppression in a chest x-ray image of a patient, the method executed at least in part by a computer and comprising: detecting and labeling one or more ribs in a region of interest in the x-ray image that includes a lung region; obtaining a rib model for one or more ribs of the image; modifying detection results for the one or more ribs by applying the rib model in the region of interest; forming a conditioned x-ray image by suppressing rib content according to the modified detection results; and storing, displaying, or transmitting the conditioned x-ray image.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE EMBODIMENTS

Figure 1:
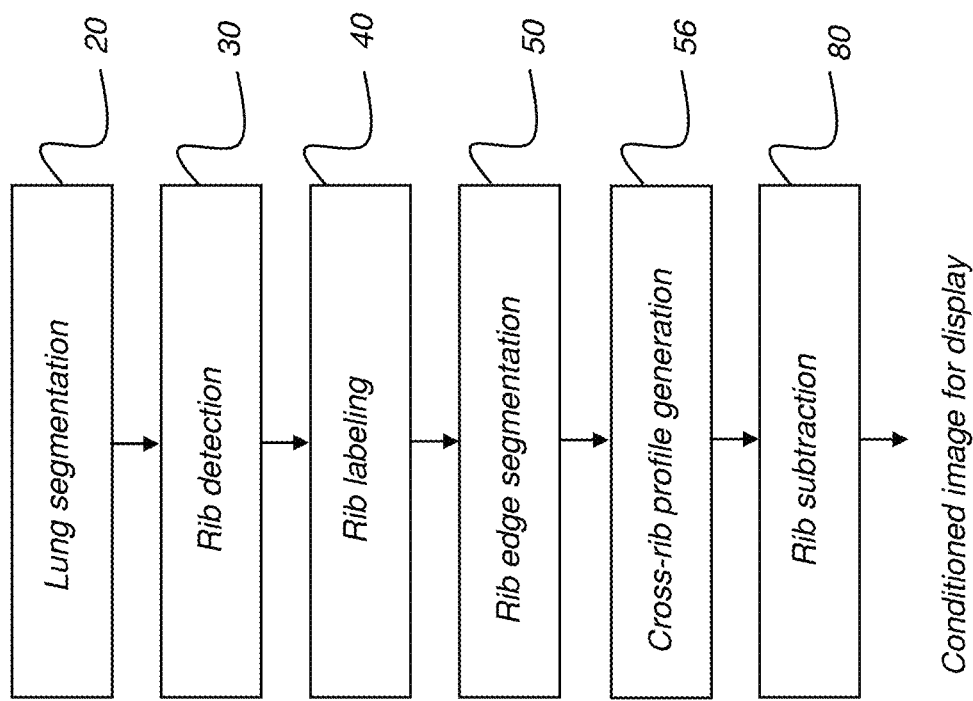
FIG. 1 is a logic flow diagram that shows steps of a procedure for rib suppression according to an embodiment of the present invention.

The following is a detailed description of the preferred embodiments of the invention, reference being made to the drawings in which the same reference numerals identify the same elements of structure in each of the several figures.

In the context of the present disclosure, the terms "first", "second", and so on, do not necessarily denote any ordinal, sequential, or priority relation, but are simply used to more clearly distinguish one element or set of elements from another, unless specified otherwise.

References in the present disclosure to an x-ray image refer to x-ray image data representative of the image obtained from radiation exposure and acquired, represented, and stored in digital form. The chest x-ray image can originate from a digital radiography (DR) detector or from scanned image data. This image data may also be obtained from an image archive that stores digital image data, such as a PACS (picture archiving and communication system).

Applicants have recognized that improvements are desired for methods that identify rib structures, so that rib features can then be suppressed in the x-ray image. Approaches would be useful, for example, that adapt rib detection methods to individual patient images. Methods using template or function-fitting of the detected rib edge have limitations for successfully characterizing large variations in the shape of ribs as well as limitations related to image quality, especially when foreign objects, e.g., tubes/lines and other devices, are captured in ICU portable chest images.

Methods such as the MTANN approach described above are not suited to conventional x-ray images, but require dual energy images as part of the training database. Further, the MTANN technique may not be able to accurately estimate the edge of the bone as well as it estimates bone density elsewhere. In addition, non-zero density estimation in non-rib areas can contribute to added noise in these areas, which affects the overall image quality of the rib suppressed images.

The detection methods described have proved to be memory-intensive, requiring significant computational resources. Robustness is also desirable.

The applicants have recognized a need for a method of rib suppression that detects ribs, possibly including clavicles, in chest x-ray images and suppresses the rib area in a chest x-ray image, meanwhile preserving the image content of underlying lung tissue.

Conventional rib detection techniques typically first locate rib/line edges, then use rib edge information to identify rib structures that lie between the rib edges. The inventors have found results from this conventional approach to be disappointing, often failing to provide accurate enough information on rib structures for acceptable levels of rib suppression. Embodiments of the present disclosure address the problem of rib suppression in a different manner, by detecting rib regions first, then, once features of individual rib structures have been identified, more accurately and robustly locating rib edges. This approach allows the complete rib structure to be identified and its affect on image content more accurately profiled than has been achieved using conventional methods. To achieve this improved level of accuracy, methods of the present disclosure apply rib modeling techniques that help to identify where rib features have been detected or are expected within the image and that help to improve the efficiency of edge detection and other image processing techniques that are used to identify rib content in the image.

The logic flow diagram of FIG. 1 shows a sequence for automated rib suppression consistent with an embodiment of the present invention for chest x-ray image processing. In a lung segmentation process 20, the lung and rib cage portions of the image are segmented, thus extracting the lung region of interest from the image. A number of approaches to lung segmentation have been proposed, including, for example, that described in U.S. Pat. No. 7,085,407 entitled "Detection of Ribcage Boundary from Digital Chest Image" to Ozaki that employs landmark detection and other utilities to detect the boundaries of the rib cage. Other methods for lung detection and segmentation include methods that detect the spine structure and use a bounding box for coarse detection, with subsequent processing for more closely identifying the boundaries of the lung or rib cage. Neural network-based logic can also be employed for generating a pixel-based lung segmentation. Boundary smoothing can also be employed, such as by using morphological filtering or other suitable processing technique, for example.

Continuing with FIG. 1 processing, with the lung region of interest or area including the lungs identified, a rib detection process 30 follows, in which structural information about the rib features is used in conjunction with image pixel intensities to separate likely rib content from non-rib image content. This step helps to eliminate from processing the image content that is not obstructed by rib features and has been found to provide improved results. Further processing of the candidate rib content is executed in a rib labeling step 40 that groups and organizes the detected rib contents. In rib labeling step 40, classification of the rib content groups likely rib pixels into corresponding categories for labeling as part of individual ribs, labels these pixels as part of the rib content of the image, and helps to remove false positives from rib detection process 30. Position, shape information, and gradient are used, for example, to help eliminate false positives. Processing in step 40 provides for classifying pixels into one or more of multiple ribs, by using some amount of prior knowledge of rib structures, such as shape, position, and general direction, and by applying morphological filtering. Among features that have been found to be particularly useful for rib classification are rib width and position, including percentage of pixels initially determined to be part of a rib feature. Other features could similarly be extracted and used for false-positive removal. Rib labeling in labeling step 40 alternately calculates a medial axis for one or more ribs to generate a skeletal image for validating rib detection and for subsequent processing including rib modeling, also used for retrieving missing or missed-labeled ribs or portion of ribs. The skeletal image has medial axis information and, optionally, other anatomical data relevant to rib location.

Characteristics such as gradient orientation and shape for the labeled rib content can then be used for subsequent processing in a rib edge segmentation step 50. In rib edge segmentation step 50, edge portions of the ribs are identified, and this identification is refined using iterative processing. Guided growth processing may alternately be used to enhance rib edge detection. A cross rib profiling step 56 generates a cross rib profile that provides values for rib compensation along the detected ribs. Finally, a rib subtraction step 80 is executed, subtracting rib edges and values from the rib profile from the chest x-ray image, to condition the image and provide a rib-suppressed x-ray image as the conditioned image for display. Weighted subtraction and various other types of conditioning familiar to those skilled in the image processing art can be used for combining the detected rib information with the original x-ray image, suppressing rib content to generate a rib-suppressed image for display or for further analysis.

Figure 2:
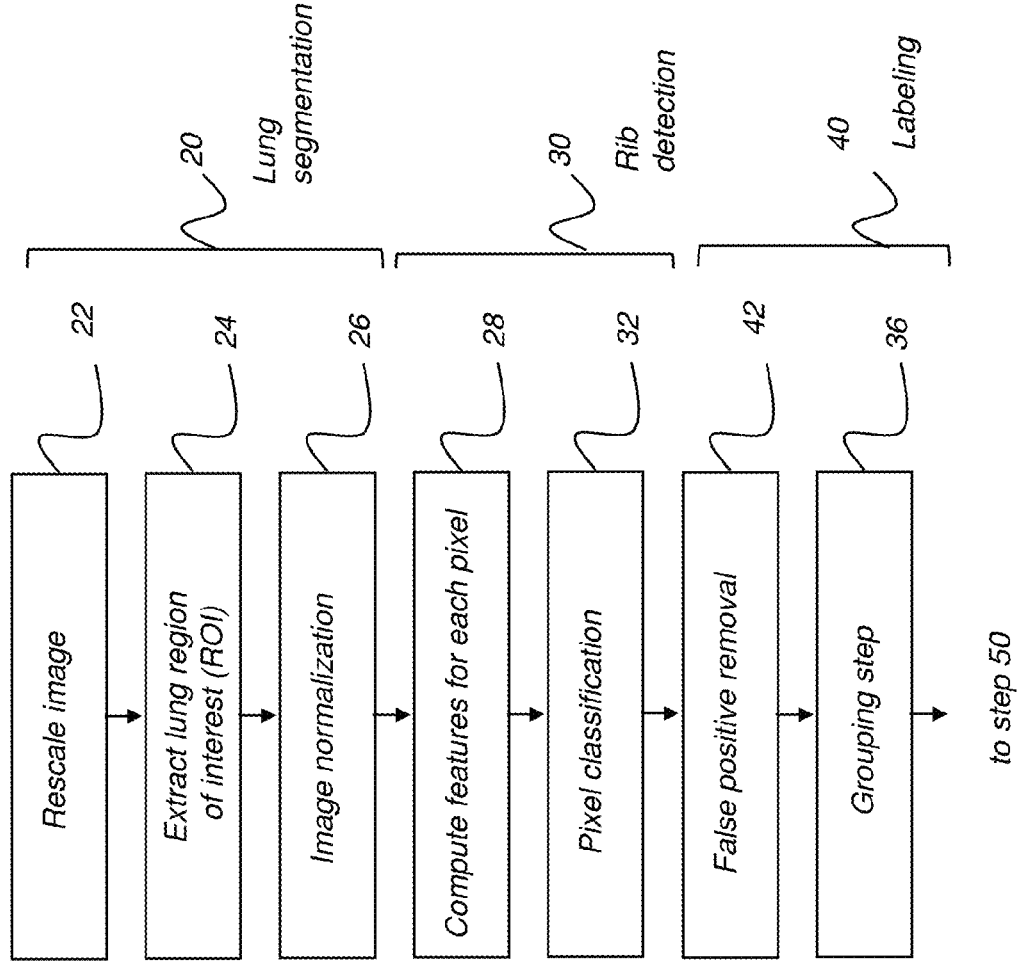
FIG. 2 is a logic flow diagram that shows processing that is performed in lung segmentation and rib detection.

The logic flow diagram of FIG. 2 shows processing that is performed in lung segmentation process 20, rib detection process 30, and labeling step 40, and shows how the results of this processing are used. In an optional scaling step 22, the image can be scaled to a lower resolution in order to speed subsequent processing. An extract ROI step 24 helps to generate position features information for more accurate definition of the region of interest (ROI). An image normalization step 26 then provides normalized information on image features, consistent with multiple images.

Rib detection process 30 determines, for pixels in the region of interest, whether or not each pixel corresponds to a rib feature. Rib detection process 30 has a features computation step 28 that computes features for each pixel, such as providing Gaussian derivative features information and position information, for example. Next, as part of rib detection step 30, a pixel classification step 32 determines whether each pixel within the lung region is a rib or non-rib pixel. Classifier techniques such as artificial neural network, supporting vector machine or random forests that are well known in the art can be used to perform the pixel classification.

In this sequence, labeling step 40 is also shown in more detail. A false positive removal step 42 executes for identifying individual ribs. False-positive pixels are first removed as part of this processing. A subsequent grouping step 36 then determines whether or not one or more groups of detected pixels can themselves be grouped together as one individual rib, based on factors such as positional relationship, connectedness and adjacence, gradient features, and the position relative to the central axis of individual groups. These ribs can be labeled according to rib pattern. Global rib modeling, based on ribs that have already been labeled and known anatomical relationships, can be used to detect a missing rib from the previous steps, as described in more detail subsequently.

Figure 3:
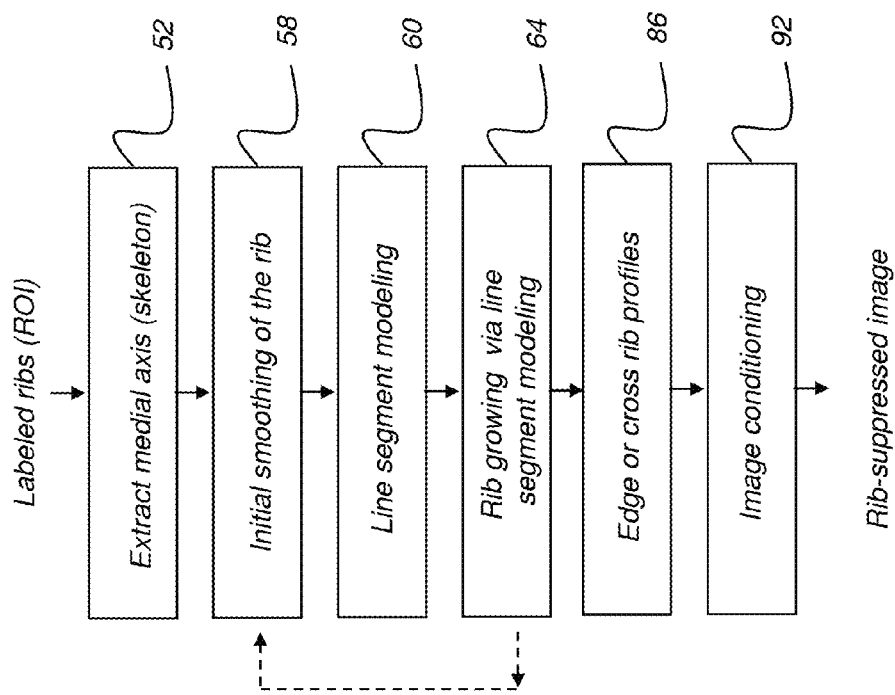
FIG. 3 is a logic flow diagram that shows iterative processing that is performed for each detected or labeled rib as part of rib edge segmentation.

The logic flow diagram of FIG. 3 shows iterative processing that is performed for each detected or labeled rib, after the processing described with respect to FIG. 2, as part of rib edge segmentation 50 (FIG. 1). The input to this processing is the set of labeled ribs. A medial axis extraction step 52 obtains the medial axis of each rib. An initial smoothing step 58 performs any necessary fitting to smooth rib edges, according to the extracted medial axis. As part of smoothing step 58, the smoothed boundaries provide a starting point for more closely approximating rib edges. Using the smoothed rib contour, one or more line segments for the upper or lower rib boundaries are generated as initial rib edge candidates. Next, one or more additional line segment candidates for each segment are generated based on calculated gradients or other features. A set of the best-fit edge candidates for the upper and lower rib edge is selected, using optimization of a model based on factors such as edge gradients, rib width, line segment smoothness, and rib shape constraints.

Continuing with the sequence of FIG. 3, a rib growing step 64 continues the line segment optimization process of modeling step 60 to extend existing line segments and merging disconnected line segments as they are detected or extrapolated from existing segments. A growing algorithm is useful where segments of the ribs are foreshortened or missing. As part of the growing algorithm, existing segments are aligned according to an anatomy model. Segments are iteratively extended and tested to determine whether or not growth is completed. Segment growth can also use edge extension techniques such as those employed for tubing detection and described in commonly assigned, copending U.S. Pat. No. 8,064,675 entitled "Computer-Aided Tubing Detection" by Huo.

Repeated iteration of the sequence of steps 58, 60, and 64, as many times as needed, helps to improve the collected rib profiles that are generated and provided in a cross-rib profile generation step 86, so that rib data that is combined with the image data in image conditioning step 92 more accurately characterizes the rib content.

Figure 4B:
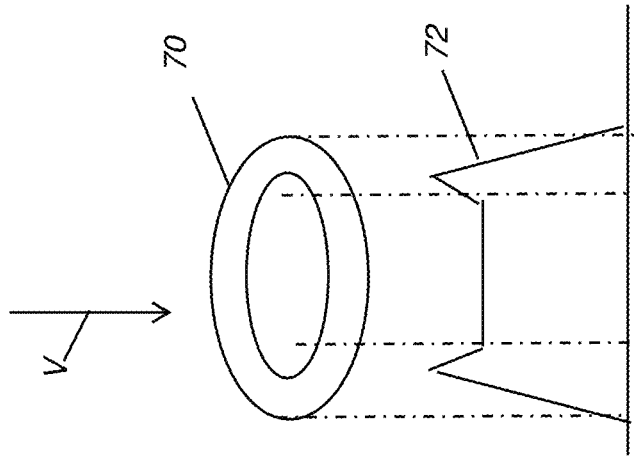
FIG. 4B is a schematic diagram that shows how a cross rib profile for a chest x-ray is generated.
Figure 4A:
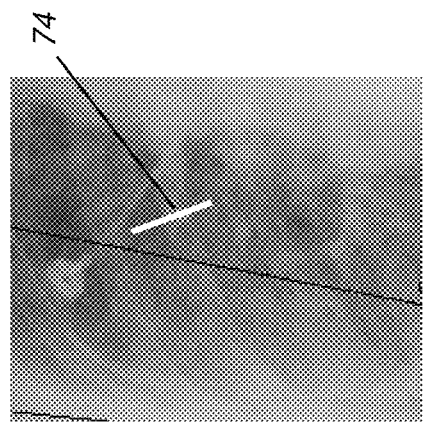
FIG. 4A shows a section of a rib with an identified portion for generating a rib profile in a chest x-ray image.

FIGS. 4A and 4B show how a cross rib profile is generated and its relationship to the chest x-ray image. In FIG. 4A, a line 74 shows the basic direction over which the profile is obtained, across the rib in a cross-sectional manner. In FIG. 4B, a rib 70 is shown schematically in cross section, representing a bony shell and a soft interior portion. A profile 72 shows how rib 70 affects image data, with peak values along the edges. X-rays are generally incident in the direction indicated V in this figure.

Profile 72 in FIG. 4B is generated using known characteristics of the rib in the chest x-ray. One method for providing rib profile 72 is to apply a low-pass filter (LPF) to the chest image and use the results of this processing to provide a cross rib profile, which is known to those skilled in image processing and analysis. An alternate method employs a model to provide an initial approximation or starting point for developing the rib profile. Using information from the model also enables rib profile information to be identified and extracted from the image itself. Whatever method is used, the usefulness of the rib profile depends, in large part, upon accurate detection of rib edges.

The two Vogelsang et al. references cited earlier describe how the cross rib profile can be generated and used. In the article "Model based analysis of chest radiographs", Vogelsang et al. particularly describe how the cross rib profile is used as a model, and show how six regions for vertical compensation values are identified and interpolation applied using this model.

Figure 5:
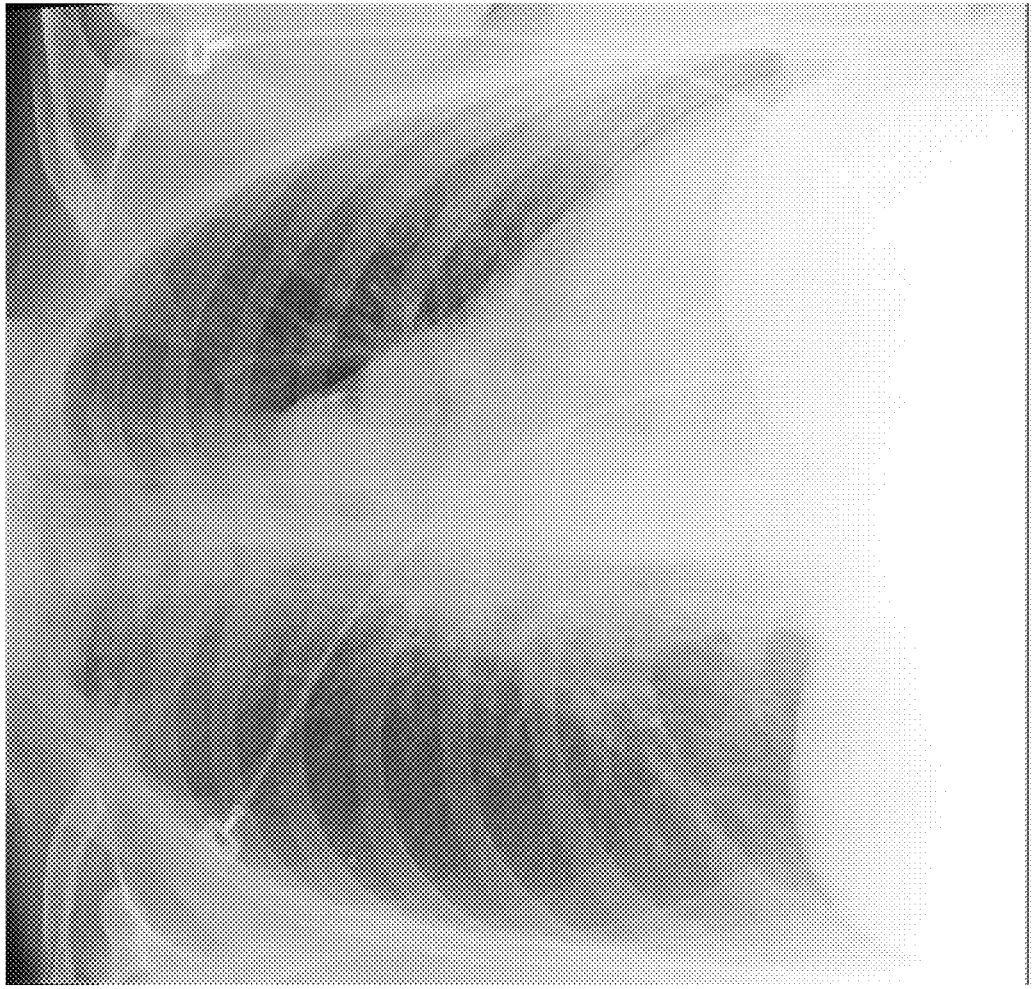
FIG. 5 shows an original chest x-ray image prior to processing for rib suppression.
Figure 6A:
FIG. 6A shows results from rib detection.
Figure 6B:
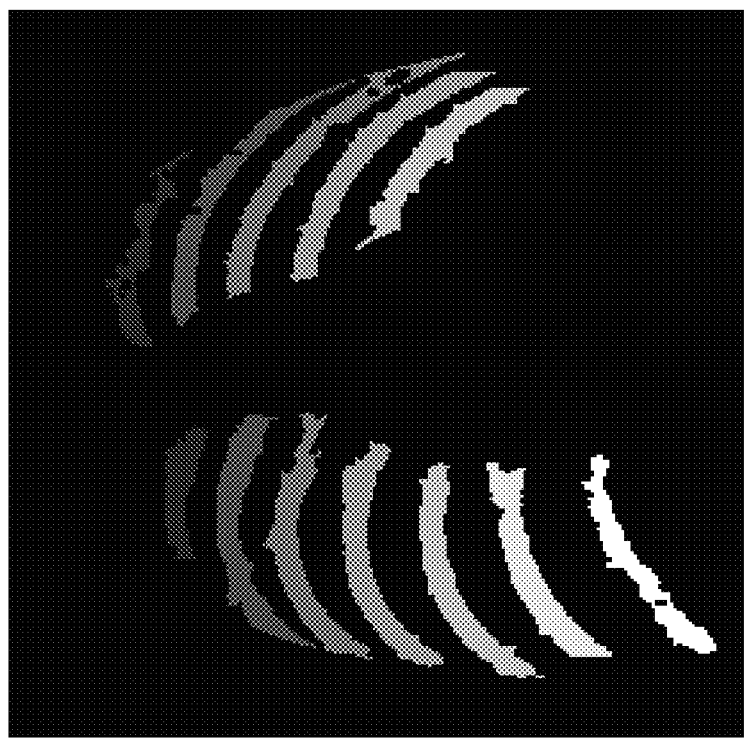
FIG. 6B shows results from rib labeling.
Figure 7:
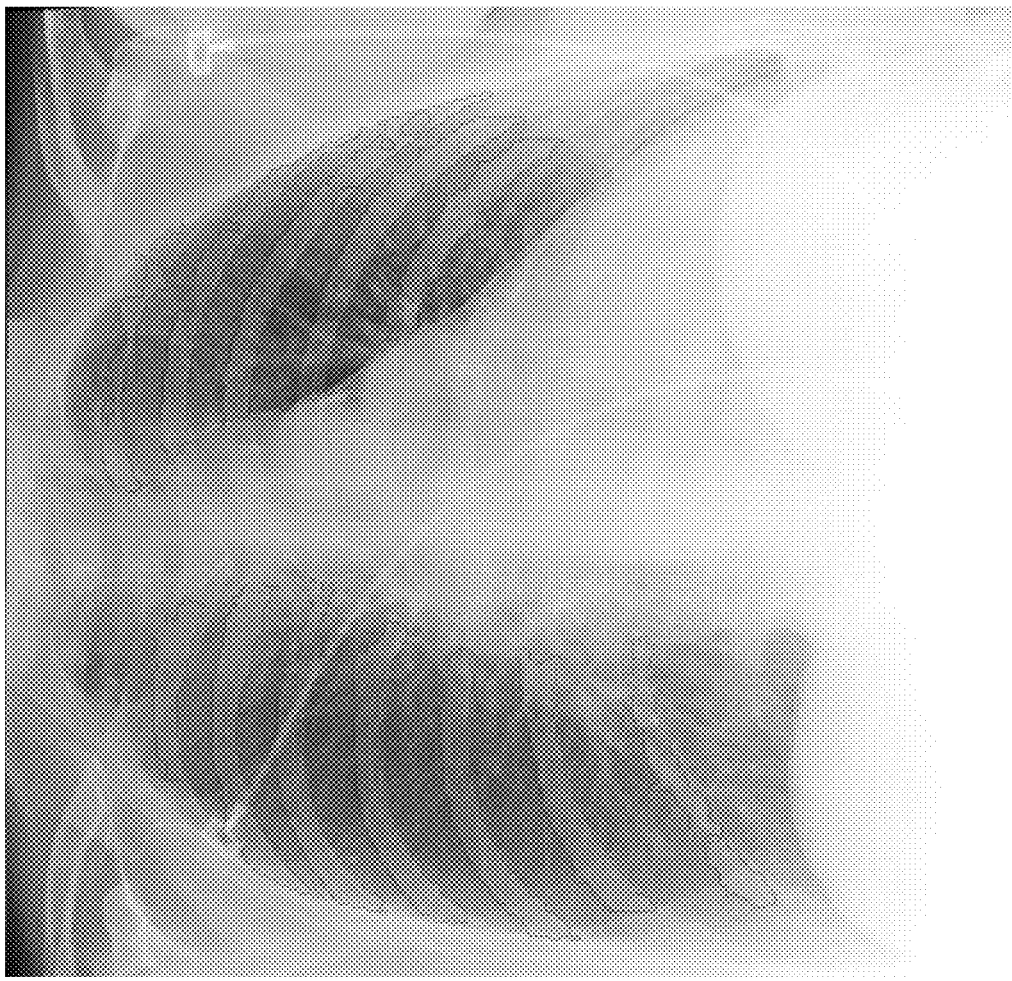
FIG. 7 shows labeled ribs overlaid onto the original image of FIG. 5.

By way of example, FIG. 5 and following show results of some of the steps of the processing sequence for rib removal according to an embodiment of the present invention. FIG. 5 shows an original chest x-ray image 38 that requires identification and removal of ribs in order to make underlying tissue more visible. FIG. 6A shows an image 44 that shows rib detection. FIG. 6B shows an image 46 following rib labeling that helps to more precisely identify the rib regions. In FIG. 7, an image 62 shows labeled ribs overlaid onto the original image 38.

Figure 8A:
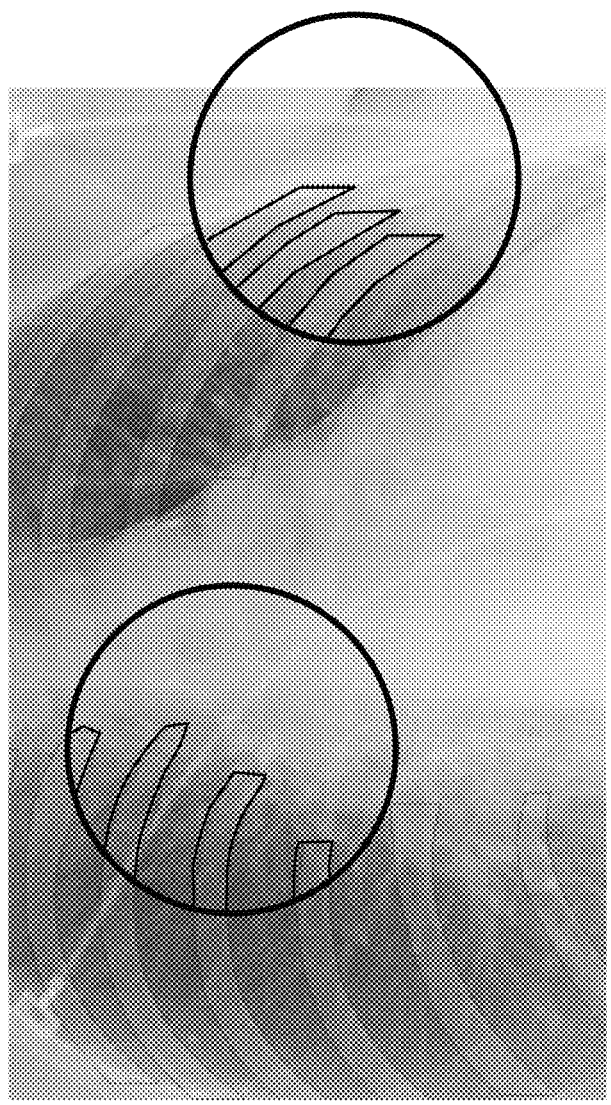
FIGS. 8A and 8B show examples of rib growing algorithms.
Figure 8B:
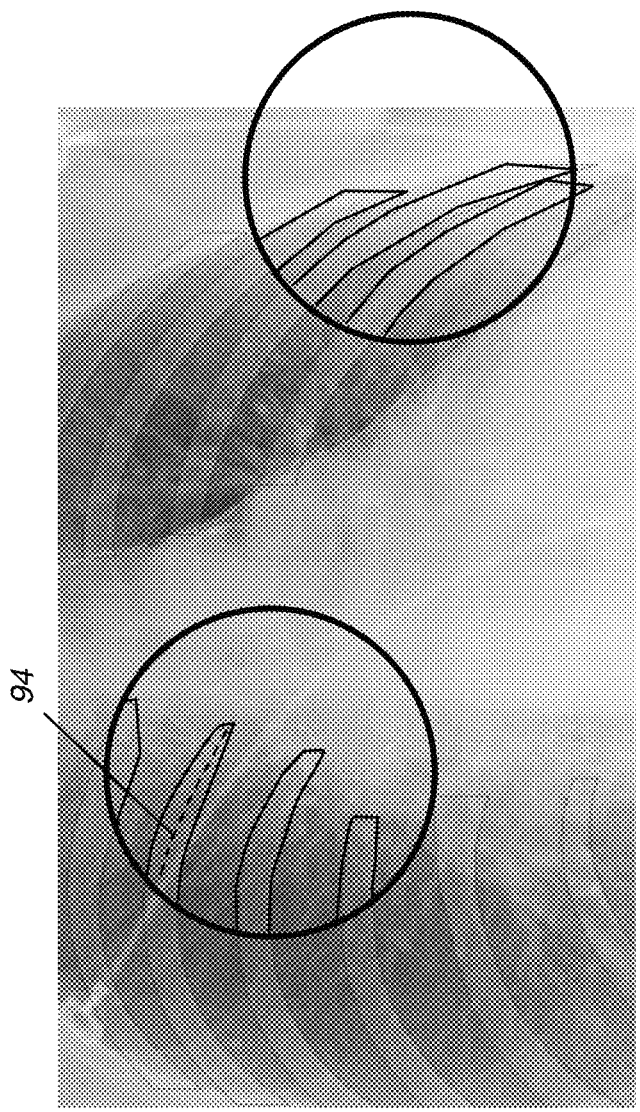

FIGS. 8A and 8B show an example of rib growing using the overlaid results of FIG. 7. Rib growing algorithms are of particular value for extending the rib curvature along the ends of the rib, where features may be unclear, and help to provide improved edge detection. In an embodiment of the present invention, rib growing algorithms follow the general curvature of a medial axis 94. FIG. 8B shows an example medial axis 94 in dashed line form.

Figure 9:
FIG. 9 shows a chest x-ray image with suppressed rib content, following a subtraction operation.

Subtraction or other ways of combining rib edge information with the final image provide a rib suppressed image, as shown in FIG. 9.

As shown in the example of FIG. 7, rib labeling performs in a satisfactory manner for many of the ribs in the chest x-ray image. However, there are a number of areas where rib features are not successfully identified by the labeling process. Portions of a rib may be omitted or one or more entire ribs may be missed due to ambiguities in rib labeling. To help remedy this problem, embodiments of the present disclosure add an adaptive rib modeling process that helps to improve rib edge detection and edge growth processing for rib segmentation and suppression.

Figure 10:
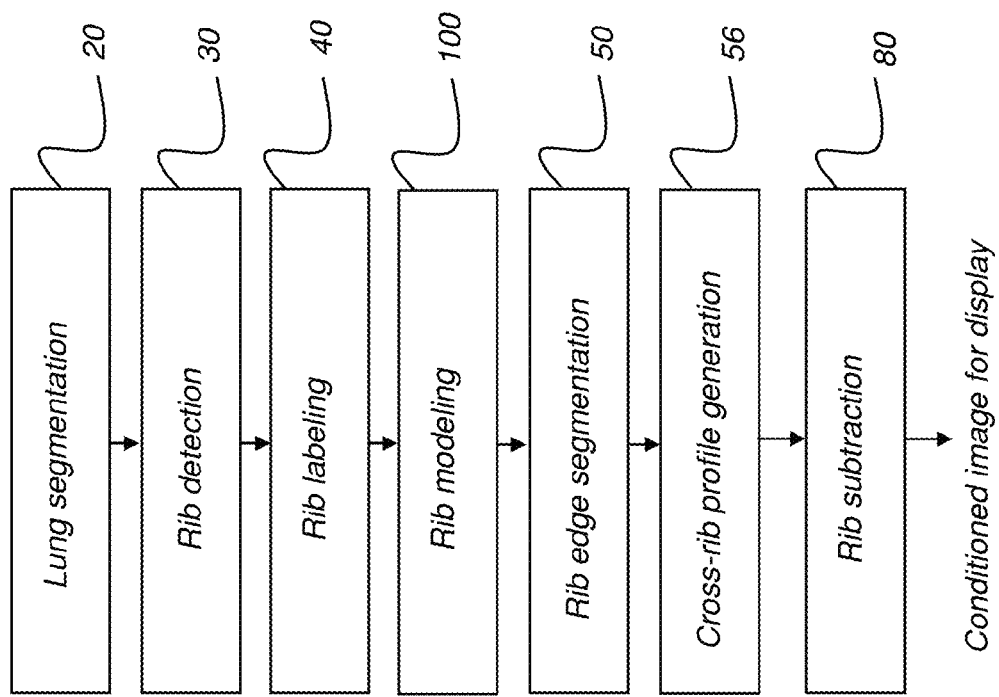
FIG. 10 is a logic flow diagram that shows processing that is performed in lung segmentation and rib detection using rib modeling.

The logic flow diagram of FIG. 10 shows a sequence for automated rib suppression consistent with an embodiment of the present disclosure for chest x-ray image processing, employing rib modeling. As previously described with respect to FIG. 1, lung segmentation process 20 extracts the lung region of interest from the chest x-ray image. Rib detection process 30 then performs an initial separation of rib content from non-rib content. Labeling step 40 classifies the likely rib pixels into corresponding categories for labeling as part of individual ribs and alternately calculates a medial axis for one or more ribs to generate a skeletal image for validating rib detection and subsequent processing.

Continuing with the FIG. 10 sequence, a rib modeling step 100 executes, obtaining and using a rib model as described in more detail subsequently. Rib edge segmentation step 50 identifies edge portions of the ribs, at least in part according to rib modeling results. Optional cross rib profiling step 56 generates a cross rib profile, as described previously. Similar to the process described with respect to FIG. 1, rib subtraction step 80 uses the rib profile to provide a conditioned, rib-suppressed image for display.

Figure 11:
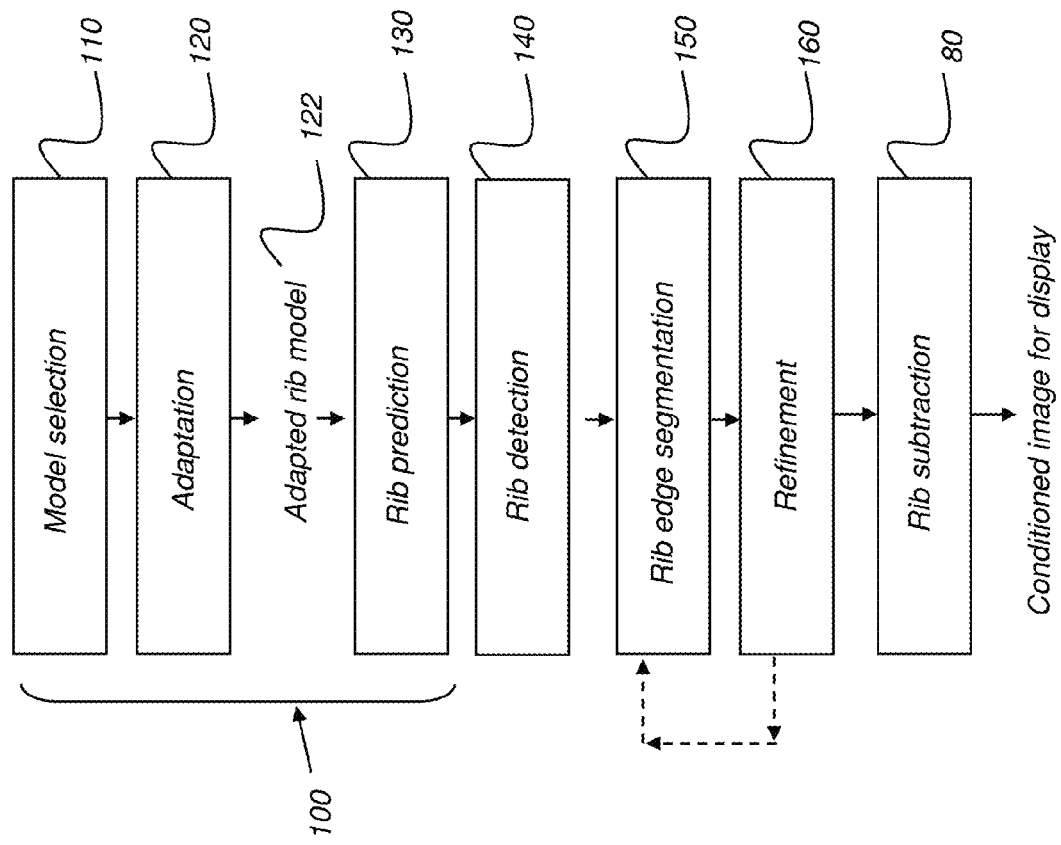
FIG. 11 is a logic flow diagram that shows in more detail how rib modeling is used to assist rib detection according to an embodiment of the present disclosure.

The logic flow diagram of FIG. 11 shows rib modeling step 100 according to an embodiment of the present disclosure. Rib modeling step 100 can be used to validate the preceding steps 20, 30, and 40 from FIG. 10 and may be used to help to identify and segment one or more missing ribs or to adjust rib detection according to the obtained image. A model selection step 110 selects an appropriate rib model for adaptation and subsequent processing. There are two types of rib model: a rib cage model and an individual rib model. The phrase "rib cage model" is used herein to denote a rib model that includes multiple ribs, such as the full set of ribs for a standard patient. The phrase "individual rib model" denotes a rib model that applies and is used for an individual rib. The individual rib model or rib cage model can be a standard model or can optionally be selected from a set of rib models in a digital image format, appropriately sized for the overall size and physical make-up of the patient. For example, a library of rib cage models can be developed and stored for use from successful analysis of a number of sample cases, employing statistical data to provide a template that indicates the likely locations of each rib feature. An adaptation step 120 then uses lung segmentation information from process 20 (FIG. 10) to adapt the shape of the selected rib model from step 110 to the particular shape of the patient's lung fields and other information specific to features of the patient. The rib model can be scaled or otherwise modified according to patient features in the x-ray image itself, such as using the results of lung field segmentation to modify rib shape. This can adjust rib curvature and extent to more closely approximate the actual rib or rib cage structure of the patient using clues from the obtained image. According to an embodiment of the present disclosure, this provides an adapted rib model 122 to assist in subsequent rib detection. Rib model 122 can be similar in appearance to image 46 shown in FIG. 6B.

Continuing with the FIG. 11 sequence, a rib prediction step 130 is then used to predict rib features including location, shape and size for each rib or missed rib from previous processing. Step 130 can be used, for example, to outline an area where a missed rib should be located in the x-ray image based on the location, size, or shape estimated A rib detection step 140 uses the predictive information provided from the adapted rib model 122 to detect rib edges within the neighborhood generally outlined in step 130. Information about likely rib position is derived from the model and is used to assist detection logic. A rib edge segmentation step 150 then performs edge detection based on results of rib detection. An optional refinement step 160 then recursively checks and corrects the rib edge detection to more positively identify the outline of the missed, partial, or ambiguous results from earlier processing. Refinement techniques use various criteria to adjust detection results, such as applying learned rules for edge curvature and direction and adjusting parameters to more closely identify rib edges. Rib subtraction step 80 then executes to generate the final conditioned image for display.

According to an alternate embodiment of the present disclosure, the sequence of FIG. 11 can be used for initial detection of rib edges. The selected rib model, adapted to patient characteristics, is used to provide a template for predicting the location of rib features. Rib edge detection then processes the image in areas defined by the rib model. This reduces the overall amount of processing required for rib edge detection.

Figure 12:
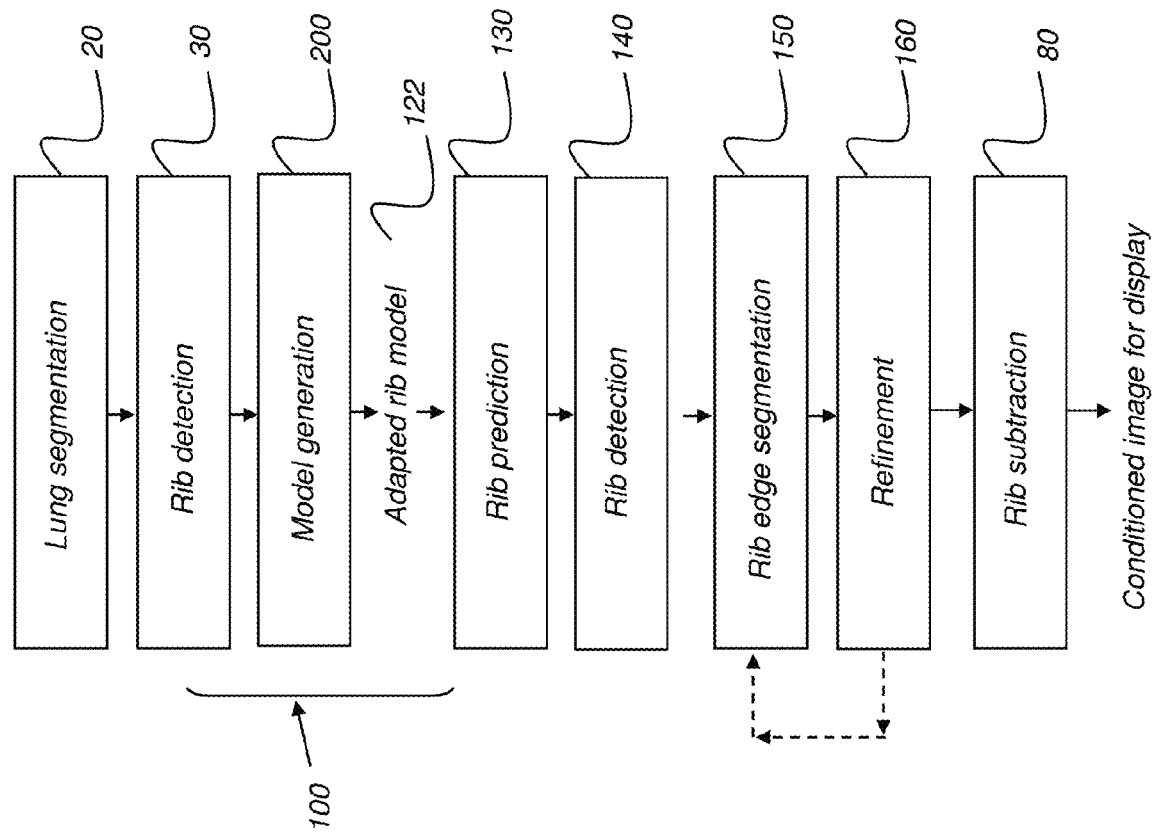
FIG. 12 is a logic flow diagram that shows in more detail how rib modeling is used to assist rib detection according to an alternate embodiment of the present disclosure.

The logic flow diagram of FIG. 12 shows an alternate embodiment of the present disclosure for rib modeling step 100 in which data obtained from the chest x-ray image itself is used to generate and adapt the rib model 122, which may be either a rib cage model or an individual rib model, as defined previously. Lung segmentation process 20 and rib detection step 30, as described previously, provide basis information for generating a template or model according to the patient's x-ray image in a model generation step 200. Shape, size or location can be estimated from the detected ribs. Shape and size of individual ribs can be adapted based on the prior knowledge, such as learned data about rib structure or detected ribs. Model generation step 200 uses information about the patient and a set of learned rules for rib features to form adapted rib model 122 that is then used as described with reference to similar steps 130, 140, 150, 160, and 80 from FIG. 11. Model generation for image features based on analysis of image content and on application of rules or presets for known feature characteristics is known to those skilled in the imaging arts and can include techniques used for image mask generation, for example.

Figure 13A:
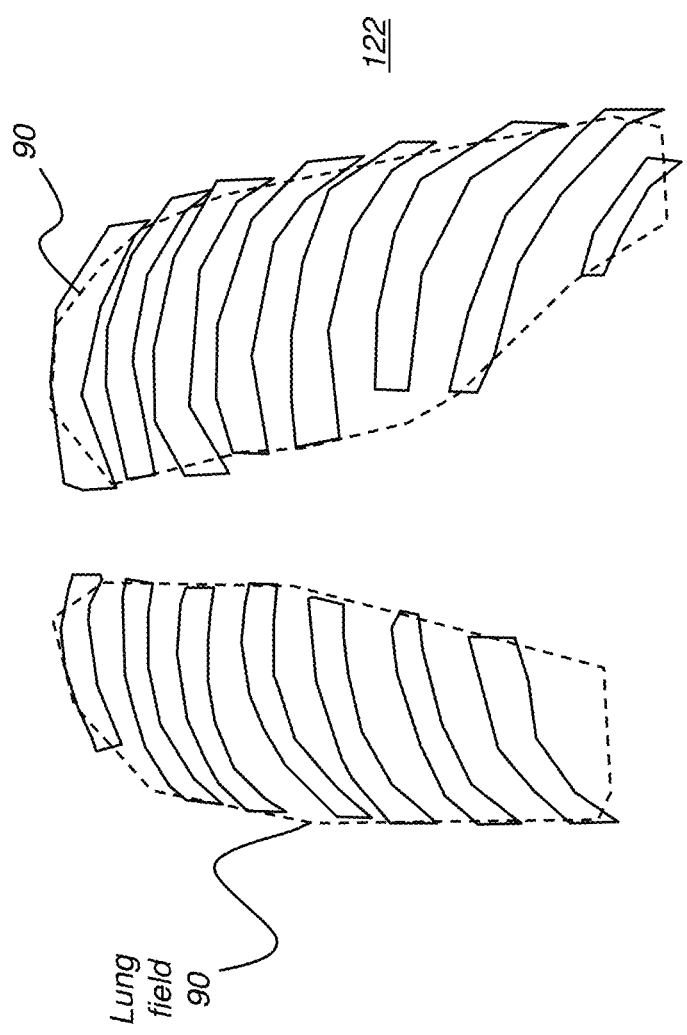
FIG. 13A shows a schematic representation of a rib cage model.
Figure 13B:
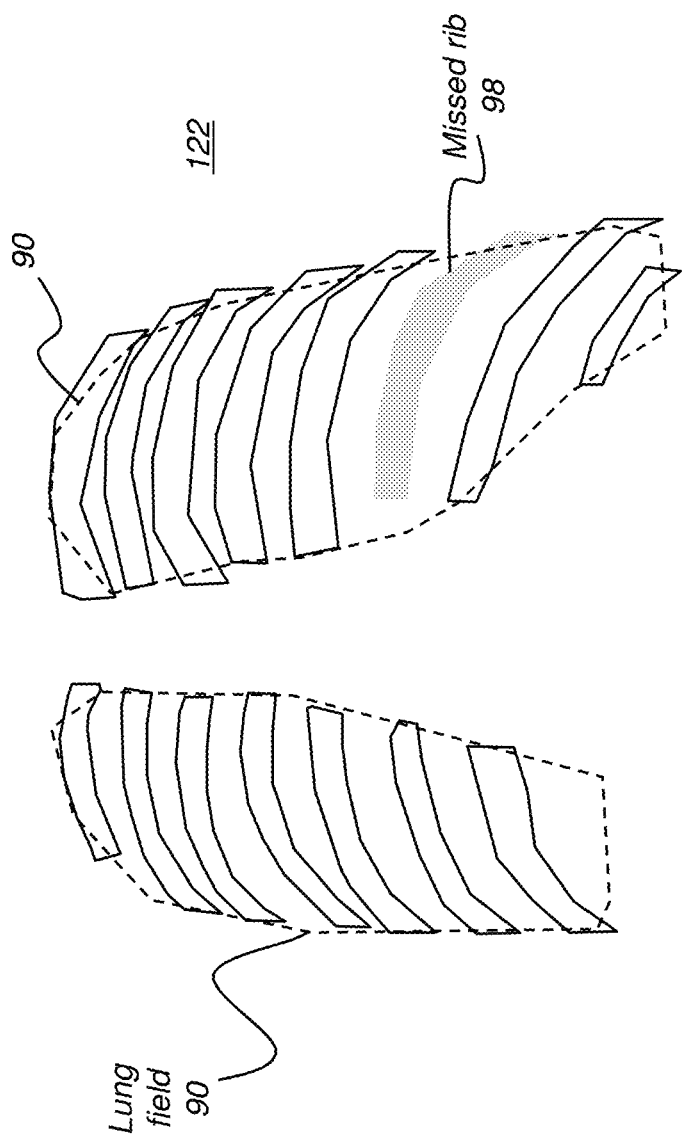
FIG. 13B shows a schematic representation of a missing rib relative to the rib cage model of FIG. 13A.

The schematic representation of FIG. 13A shows an exemplary adapted rib cage model 122. Lung fields 90 are indicated in dashed outline. FIG. 13B shows a schematic representation of a missed rib 98 relative to the rib cage model of FIG. 13A.

Figure 14C:
FIG. 14C shows an example of the chest x-ray of FIGS. 14A and 14B with ribs suppressed, following processing using modeling.
Figure 14B:
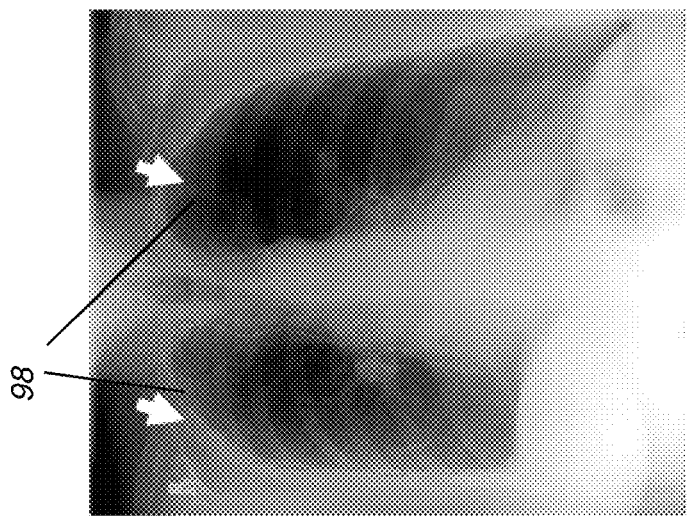
FIG. 14B shows an example of a chest x-ray following processing with missed ribs.
Figure 14A:
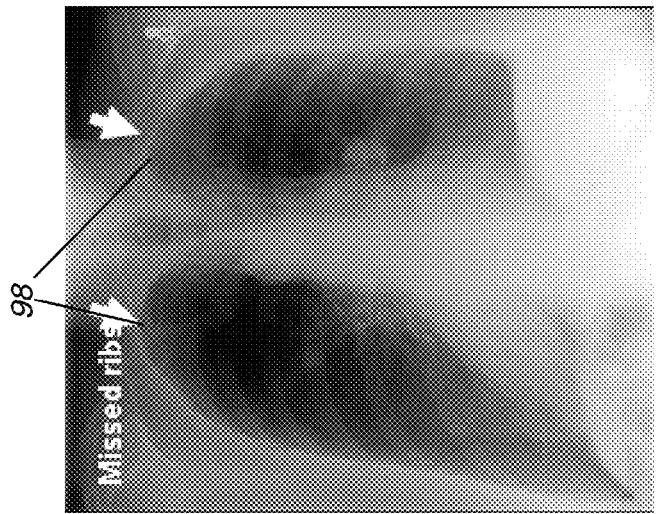
FIG. 14A shows an example of a chest x-ray following processing with missed ribs.

FIGS. 14A and 14B show missed ribs 98 and rib detection obtained using the processing of FIGS. 10-12. FIG. 14C shows rib suppressed results in the conditioned image for display.

Embodiments of the present invention help to provide more accurate detection of rib edges than available using conventional methods. In an alternate embodiment of the present invention, only the rib edge profiles are subtracted from the original image to provide rib suppression.

Consistent with one embodiment, the present invention utilizes a computer program with stored instructions that perform on image data that is accessed from an electronic memory. As can be appreciated by those skilled in the image processing arts, a computer program of an embodiment of the present invention can be utilized by a suitable, general-purpose computer system, such as a personal computer or workstation. However, many other types of computer systems can be used to execute the computer program of the present invention, including an arrangement of networked processors, for example. The computer program for performing the method of the present invention may be stored in a computer readable storage medium. This medium may comprise, for example; magnetic storage media such as a magnetic disk such as a hard drive or removable device or magnetic tape; optical storage media such as an optical disc, optical tape, or machine readable optical encoding; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the internet or other network or communication medium. Those skilled in the art will further readily recognize that the equivalent of such a computer program product may also be constructed in hardware.

It is noted that the term "memory", equivalent to "computer-accessible memory" in the context of the present disclosure, can refer to any type of temporary or more enduring data storage workspace used for storing and operating upon image data and accessible to a computer system, including a database. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It is understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

It is noted that there can be any of a number of methods used for functions such as segmentation of ribs from other tissue in the chest x-ray image or for filtering portions of the image content.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A method for rib suppression in a chest x-ray image of a patient, executed at least in part by a computer, comprising:
   detecting and labeling one or more ribs in a region of interest in the x-ray image that includes a lung region;
   obtaining a rib template for one or more ribs of the image from a rib library comprising a plurality of rib templates;
   modifying detection results for the one or more ribs by applying the rib template in the region of interest;
   forming a conditioned x-ray image by suppressing rib content according to the modified detection results; and
   storing, displaying, or transmitting the conditioned x-ray image.

2. The method of claim 1 wherein modifying the detection results comprises performing edge detection.

3. A method for rib suppression in a chest x-ray image of a patient, executed at least in part by a computer, comprising:
   detecting and labeling one or more ribs in a region of interest in the x-ray image that includes a lung region;
   obtaining a rib template for one or more ribs of the image from a rib library comprising a plurality of rib templates, wherein obtaining the rib template comprises selecting a rib template from a plurality of rib templates of a plurality of patients having similar patient characteristics;
   modifying detection results for the one or more ribs by applying the rib template in the region of interest;
   forming a conditioned x-ray image by suppressing rib content according to the modified detection results; and
   storing, displaying, or transmitting the conditioned x-ray image.

4. The method of claim 1 wherein obtaining the rib template comprises generating a rib template according to the detection and labeling results.

5. The method of claim 3 further comprising modifying the rib template according to patient features in the x-ray image.

6. The method of claim 1 wherein detecting and labeling one or more ribs further comprises scaling the image to a reduced resolution.

7. The method of claim 1 wherein applying the rib template comprises predicting rib features for one or more ribs and wherein the rib template shows the position of a plurality of ribs.

8. The method of claim 1 wherein detecting and labeling one or more ribs further comprises extracting a medial axis from at least one of the one or more ribs.

9. The method of claim 1 wherein applying the rib template further comprises identifying rib edges.

10. The method of claim 1 wherein detecting and labeling one or more ribs in the image comprises classifying pixels within the lung region of interest as rib or non-rib pixels.

11. A method for rib suppression in a chest x-ray image of a patient, executed at least in part by a computer, comprising:
   segmenting a lung region within the image;
   detecting and labeling one or more ribs in a region of interest in the x-ray image that includes the lung region;
   selecting a rib cage template for the one or more ribs in the region of interest from a rib cage library comprising a plurality of rib cage templates according to the one or more detected ribs;
   adapting the selected rib cage template to the x-ray image according to the segmented lung region and applying the selected rib cage template for detecting rib edges for the one or more detected ribs within the region of interest;
   forming a conditioned x-ray image by suppressing rib content according to the detection results for ribs and rib edges; and
   storing, displaying, or transmitting the conditioned x-ray image.

12. The method of claim 11 further comprising generating cross rib profiles along the detected ribs and further conditioning the x-ray image according to the cross rib profiles.

13. The method of claim 11 further comprising:
   selecting the rib cage template for the one or more ribs includes selecting a rib cage template from a rib cage library comprising a plurality of rib cage templates having similar patient characteristics, and
   modifying the rib cage template according to patient features in the x-ray image.

14. The method of claim 11 wherein detecting and labeling one or more ribs further comprises scaling the image to a reduced resolution.

15. The method of claim 11 wherein applying the rib cage template comprises predicting rib features for one or more ribs according to the rib cage template.

16. The method of claim 11 wherein detecting and labeling one or more ribs further comprises extracting a medial axis from at least one of the one or more ribs.

17. The method of claim 11 further comprising recursively refining rib edge detection.

18. A method for rib suppression in a chest x-ray image of a patient, executed at least in part by a computer, comprising:
   segmenting a lung region within the image;
   detecting and labeling one or more ribs in a region of interest in the x-ray image that includes the lung region;
   selecting a rib template for one or more ribs of the image from a rib library comprising a plurality of rib templates according to the one or more detected ribs;
   modifying detection results for the one or more ribs by applying the selected rib template in the region of interest;
   forming a conditioned x-ray image by suppressing rib content according to the modified detection results; and
   storing, displaying, or transmitting the conditioned x-ray image.

19. The method of claim 18 further comprising adapting the generated rib template according to the lung region segmentation.

20. The method of claim 18, wherein detecting and labeling one or more ribs in a region of interest comprises:
   applying a pixel classification to the one or more detected ribs in the region of interest; and
   using the pixel classification, labeling the one or more detected ribs in the region of interest.

* * * * *